US010809893B2

(12) United States Patent
Lewis

(10) Patent No.: US 10,809,893 B2
(45) Date of Patent: Oct. 20, 2020

(54) SYSTEM AND METHOD FOR RE-SIZING AND RE-POSITIONING APPLICATION WINDOWS IN A TOUCH-BASED COMPUTING DEVICE

(71) Applicant: Insyde Software Corp., Taipei (TW)

(72) Inventor: Timothy A. Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/455,366

(22) Filed: Aug. 8, 2014

(65) Prior Publication Data

US 2015/0046871 A1 Feb. 12, 2015

Related U.S. Application Data

(60) Provisional application No. 61/864,316, filed on Aug. 9, 2013.

(51) Int. Cl.
*G06F 3/0484* (2013.01)
*G06F 3/0486* (2013.01)
(Continued)

(52) U.S. Cl.
CPC ........ *G06F 3/04842* (2013.01); *G06F 3/0486* (2013.01); *G06F 3/04883* (2013.01); *G06F 9/451* (2018.02)

(58) Field of Classification Search
CPC .... G06F 3/048; G06F 3/04817; G06F 3/0482; G06F 3/04845; G06F 3/0486;
(Continued)

(56) References Cited

U.S. PATENT DOCUMENTS 9,477,331 B2 * 10/2016 Westerman ............. G06F 3/041
2007/0250788 A1* 10/2007 Rigolet ................. G06F 3/0483
715/788
(Continued)

FOREIGN PATENT DOCUMENTS

TW M347623 U 12/2008
TW M350737 U 2/2009
(Continued)

OTHER PUBLICATIONS

Boyce et al., Windows 8 Bible, e-book published Oct. 23, 2012, pp. 12-13.*
(Continued)

*Primary Examiner* — Eric J Yoon
(74) *Attorney, Agent, or Firm* — McCarter & English, LLP; John S. Curran

(57) ABSTRACT

A technique for improving application window displays in a multi-window graphical user interface in a touch-based computing device is discussed. By selecting an application window or corresponding thumbnail icon in a multi-window graphical user interface using a finger touch and dragging the application window or icon to an edge of the screen indicated by another finger, the edge of the selected application window may be automatically aligned with respect to that screen edge. Additionally, already open application windows may be automatically re-sized and re-positioned to accommodate the newly re-sized application window.

8 Claims, 16 Drawing Sheets

(51) Int. Cl.
*G06F 3/0488* (2013.01)
*G06F 9/451* (2018.01)

(58) Field of Classification Search
CPC .............. G06F 3/0488; G06F 3/0487; G06F 2203/04803; G06F 3/04886; G06F 3/04842; G06F 3/0481; G06F 9/451
See application file for complete search history.

(56) References Cited

U.S. PATENT DOCUMENTS

| | | |
|---|---|---|
| 2008/0036743 A1 | 2/2008 | Westerman et al. |
| 2010/0245242 A1 | 9/2010 | Wu et al. |
| 2011/0209099 A1 | 8/2011 | Hinckley et al. |
| 2012/0206377 A1* | 8/2012 | Zhao ................. G06F 3/041 345/173 |
| 2013/0042203 A1 | 2/2013 | Wong et al. |
| 2013/0147903 A1* | 6/2013 | Weiser ................. H04M 3/567 348/14.08 |
| 2013/0170013 A1* | 7/2013 | Tonar ................... B60R 1/088 359/296 |
| 2013/0219343 A1* | 8/2013 | Nan ..................... G06F 3/0486 715/838 |
| 2014/0157163 A1* | 6/2014 | Strutin-Belinoff ........................ G06F 3/04883 715/769 |
| 2014/0351722 A1* | 11/2014 | Frederickson ........ G06F 9/4443 715/761 |
| 2015/0153929 A1* | 6/2015 | Bernstein .............. G06F 3/0481 715/781 |

FOREIGN PATENT DOCUMENTS

| | | |
|---|---|---|
| TW | I357012 B | 1/2012 |
| TW | I373728 B | 10/2012 |

OTHER PUBLICATIONS

W. Ahmed, "Windows 8.1 Multitasking & Improved Snap Feature," published Jun. 27, 2013, pp. 1-3, downloaded from the Addictive Tips website at http://www.addictivetips.com/windows-tips/windows-8-1-multitasking-improved-snap-feature/.*

* cited by examiner

SYSTEM AND METHOD FOR RE-SIZING AND RE-POSITIONING APPLICATION WINDOWS IN A TOUCH-BASED COMPUTING DEVICE

RELATED APPLICATIONS

This application is related to, and claims the benefit of, United States Provisional Patent Application No. 61/864,316, entitled "System and Method for Touch Screen Resizing and Positioning", filed Aug. 9, 2013, the contents of which are incorporated herein by reference in their entirety.

BACKGROUND

Touch-based displays are being found on an increasing amount of computing devices. The touch-based displays generally include a touch screen, a display panel and a controller. The display panel is mounted underneath the transparent touch screen. The controller is in electrical communication with the touch screen and display panel. When a user touches the touch screen, the user's finger pressure on the touch screen is interpreted as input by the controller which then adjusts the display based on the input (similarly to how mouse movements and button presses are interpreted in traditional computing environments featuring non-touch screen displays). The touch screens on mobile devices, such as tablet computing devices, smaller laptops and mobile phones, because of the overall size of the device, are often required to be smaller than those screens found on full size laptops or desktop computing systems.

BRIEF SUMMARY

Embodiments of the present invention improve application window displays in a multi-window graphical user interface for a touch-based computing device. An application window or corresponding thumbnail icon may be selected in a multi-window graphical user interface using a finger touch and dragged to an edge of an application display area indicated by another finger. Upon release of the dragging finger at the identified edge, the selected application window may be automatically aligned with respect to the identified edge of the application display area. Additionally, already open application windows may be automatically re-sized and re-positioned to accommodate the display of the selected application window.

In one embodiment, a computing device-implemented method for resizing application windows in a computing device equipped with a touch screen and display panel includes identifying an indication of a first edge of an application display area on the display panel. The identifying is based on a detection of contact of a first finger with the computing device. The method also identifies a selection of an application window or an application thumbnail icon displayed on the display panel. The application window or application thumbnail icon is selected with a second finger using the touch screen. Additionally the method also identifies through the touch screen an indication of a dragging of the selected application window or selected application thumbnail icon by the second finger to the first edge. The selected application window, or an application window corresponding to the selected thumbnail icon, is re-positioned and re-sized with respect to the indicated first edge in response to a detected release by the second finger of the selected application window or thumbnail icon.

In another embodiment, a computing device is configured to re-position and re-size application windows in response to touch indicators. The computing device includes touch screen, a display panel and a processor. The processor is configured to execute instructions that cause the computing device to identify an indication of a first edge of an application display area on the display panel. The identifying is based on a detection of contact of a first finger with the computing device. The computing device also identifies a selection of an application window or an application thumbnail icon displayed on the display panel. The application window or application thumbnail icon is selected with a second finger using the touch screen. The computing device identifies through the touch screen an indication of a dragging of the selected application window or application thumbnail icon by the second finger to the first edge. The selected application window, or an application window corresponding to the selected thumbnail icon, is re-positioned and re-sized with respect to the indicated first edge in response to a detected release by the second finger of the selected application window or thumbnail icon.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Touch screen computing devices, especially touch screen mobile devices, frequently feature screens of a smaller size so that manipulation of displayed windows via finger movements becomes difficult. Embodiments of the present invention simplify the screen layout actions taken by users of a user interface when their fingers provide touch input. By assuming that application windows should be displayed in as large an area as practical with other application windows, and by allowing the user to indicate the type of sharing with a multi-touch or touch-and-button gesture, window management is improved over conventional approaches.

Figure 1A:
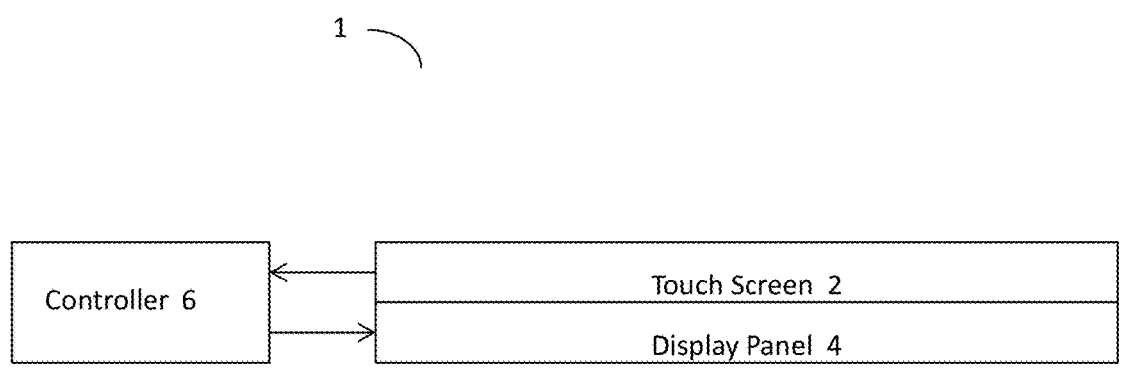
FIG. 1A depicts an exemplary touch-based interface for a computing device used by an embodiment of a present invention.

FIG. 1A depicts an exemplary touch-based interface for a computing device used by an embodiment of a present invention. The exemplary touch-based interface includes a touch screen 2 and a display panel 4. The touch screen 2 sits on top of the display panel 4. The touch screen is transparent so as to allow the display panel to be seen by a user of the computing device. A controller 6 is in electrical communication with the touch screen 2 and display panel 4. The controller 6 identifies finger contacts or other depressions of the touch screen as user input. It should be appreciated that although the input received via the touch screen throughout this description may be described as a "finger contact", "finger touch", "finger dragging" , "finger selection", etc., as such finger contacts are the most common type of input, descriptions of finger-based input herein should be understood to also encompass any other types of user-generated depressions of the touch screen. The controller 6 adjusts the images displayed on the display panel 4 according to the computing device's window management policy for the type of identified finger contact. As explained further below, the window management policy of the present invention applied by the controller 6 for different types of finger contact and gestures provides an improved technique for displaying, positioning and sizing windows on a touch-based device.

Figure 1B:
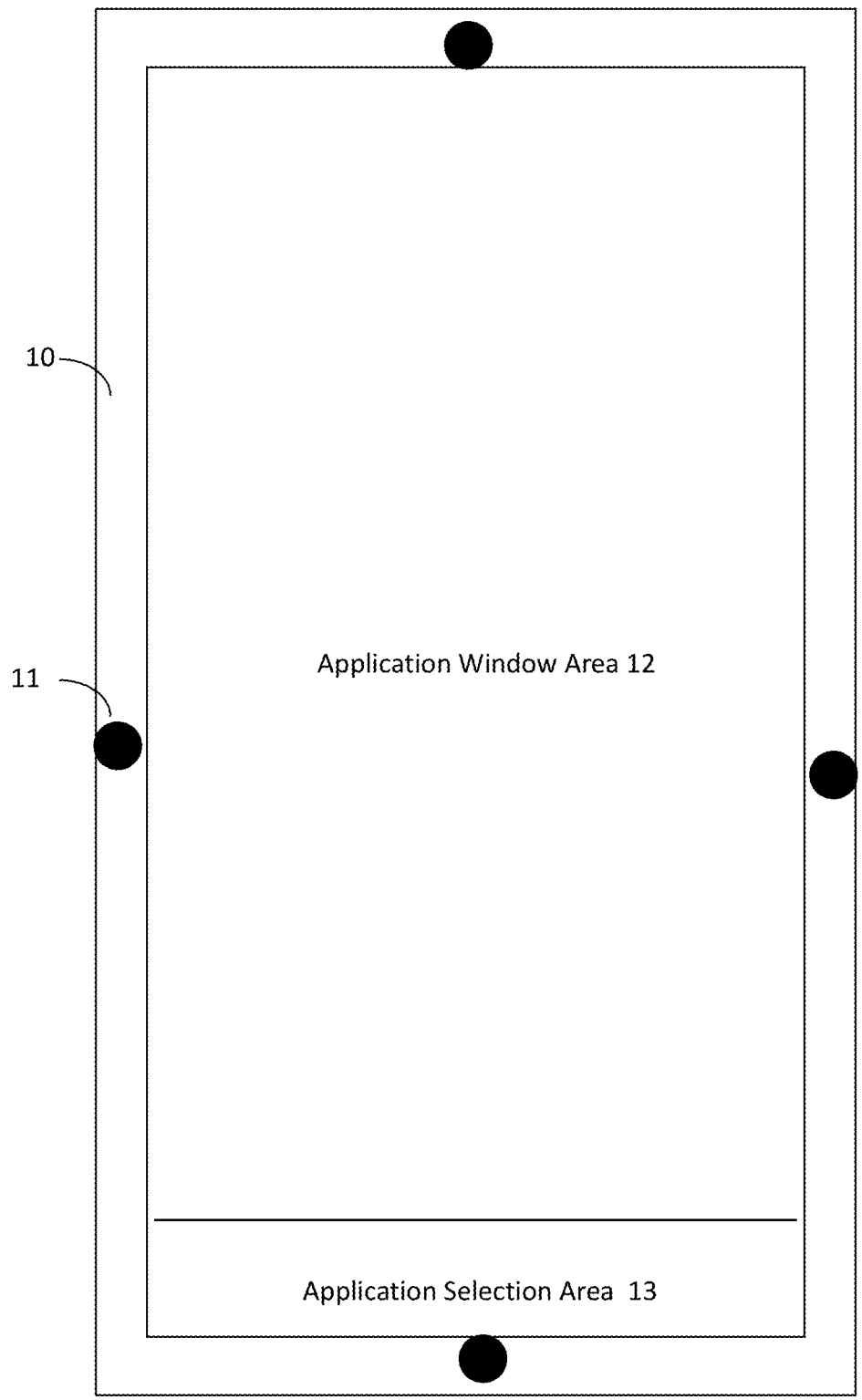
FIG. 1B depicts an exemplary bezel surrounding a display panel and touch screen in an embodiment of the present invention.

Embodiments of the present invention attempt to improve user manipulation of windows in a touch-based interface by simplifying the manner in which application windows being displayed by the display panel 4 are re-positioned and/or re-sized with respect to a specified edge of the application display area. To that end, embodiments first identify an identification of one of the edges of an application display area provided by the display panel 4 by detecting contact from a first finger of a user that indicates the specified edge. In a traditional rectangular or square display panel, there will be four edges, a top edge, a bottom edge and two side edges although it should be appreciated that non-quadrilateral and/or non-linear displays may also be utilized by embodiments of the present invention. FIG. 1B depicts an exemplary rectangular display panel 4 that includes a bezel 10 surrounding the display panel (and the overlapping touch screen 2) in an embodiment of the present invention. The display panel 4 provides an application display area that includes an application window area 12 in which running applications may display output and an application selection area 13 from which application thumbnail icons may be selected. In one embodiment, a contact switch or a pressure sensor 11 may be placed under each side of the bezel so as to be activated by pressure on the bezel from one or more of the user's fingers. Activation of a switch or pressure sensor 11 may result in a signal being sent to the controller 6.

Figure 2A:
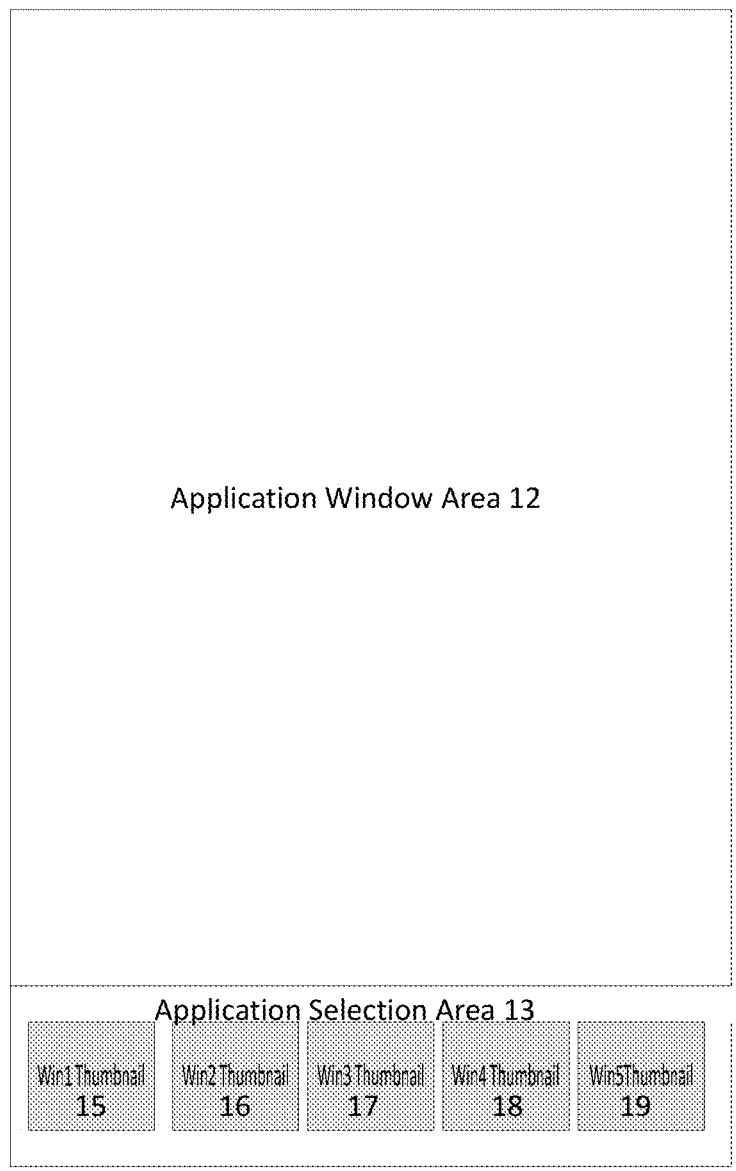
FIG. 2A depicts an exemplary application window area and exemplary application selection area in a multi-window graphical user interface provided by an embodiment of the present invention.

In further detail, FIG. 2A depicts an exemplary application display area in a multi-window graphical user interface provided by an embodiment of the present invention. The application display area provided by the display panel 4 is divided into two large areas: an application window area 12 and an application selection area 13. The application selection area 13 shows applications that can be selected in a thumbnail icon form, whether for already running applications (including minimized or partially-minimized applications) or applications available for launch. The application window area 12 represents the portion of the screen in which running applications can display content generated by the application in their respective application windows. In FIG. 2A, the application selection area 13 includes five thumbnail icons 15-19 for five currently minimized applications, Win1, Win2, Win3, Win4 and Win 5 while the application window area 12 contains no active application windows.

Figure 2B:
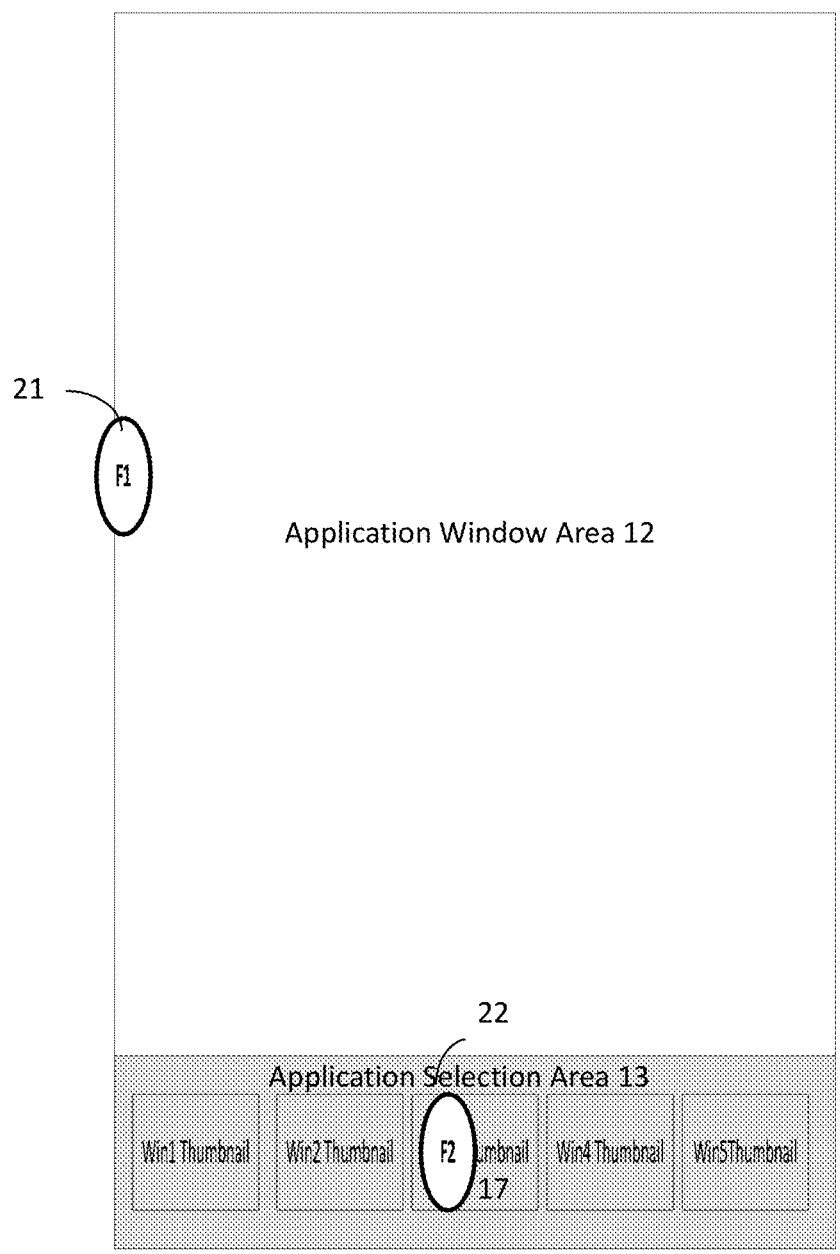
FIG. 2B depicts an exemplary edge identification and application thumbnail icon selection by a first and second finger in an embodiment of the present invention.
Figure 2C:
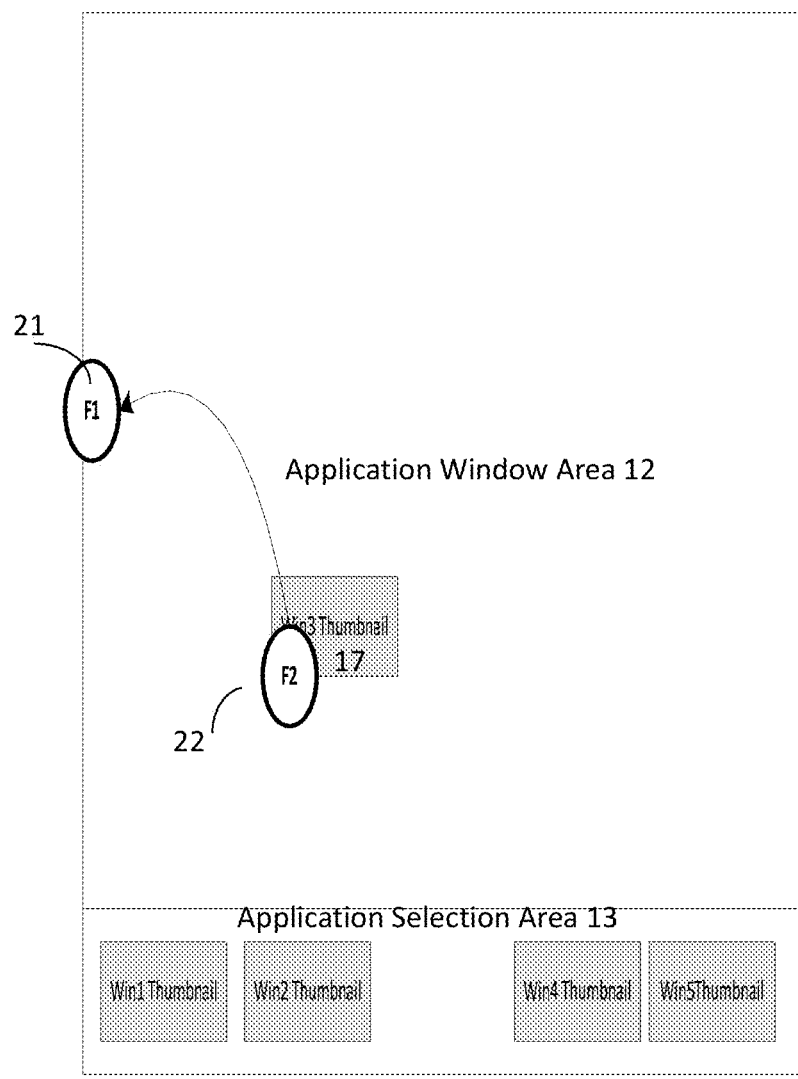
FIG. 2C depicts the selected application thumbnail icon of FIG. 2B being dragged to the identified edge in an embodiment of the present invention.
Figure 2D:
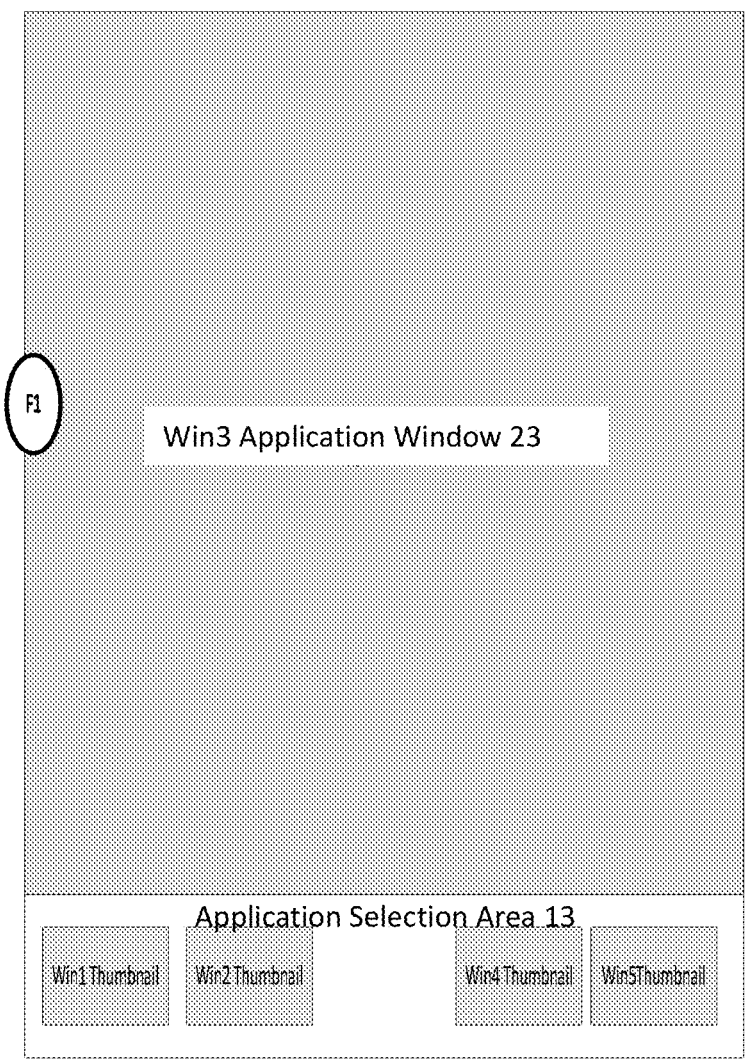
FIG. 2D depicts the automatic display of the application window for the selected application thumbnail icon of FIGS. 2B-2C upon the release of the dragged icon by the second finger in an embodiment of the present invention.

Embodiments of the present invention allow a user to indicate one of the edges of the application display area and manipulate a selected application window with respect to that indicated edge. For example, FIG. 2B depicts an exemplary edge identification and application thumbnail icon selection by a first and second finger in an embodiment of the present invention. A first finger (F1) 21 indicates an edge of an application display area. In this example, the first finger indicates the left edge of the application display area. The indication may be identified as a result of the first finger putting pressure on a pressure sensor 11 underneath the bezel 10 or may be based on a full or partial finger contact with the edge of the touch screen that is identified by the controller. The full or partial contact with the edge of the touch screen may be identified based on a finger profile. The use of the finger profile to identify an edge selection is discussed further below. A second finger (F2) 22 is placed on the Win3 thumbnail icon 17 representing the application Win3. Once the user has selected the application thumbnail icon 17, the second finger may drag the icon to the edge of the application display area identified by the first finger as depicted in FIG. 2C. Upon the user releasing the dragged icon (by removing the second finger's pressure) at the identified edge of the application display area, the corresponding application window for the dragged icon may be automatically displayed in a maximized form. FIG. 2D depicts the automatic display of the Win3 application window 23 for the selected and dragged application thumbnail icon 17 of FIGS. 2B-2C. In this example, since no other windows were currently being displayed in the application window area 12 at the time of the selection, dragging and release of the icon, the Win3 application window 23 is automatically displayed based on the window management policy so as to fill the entire application window area 12. Alternatively, the window management policy could specify that the window be displayed so that the edge of the application window is aligned with and matches the size of the identified edge but the Win3 application window 23 fills less than the entire application window area 12.

Figure 3A:
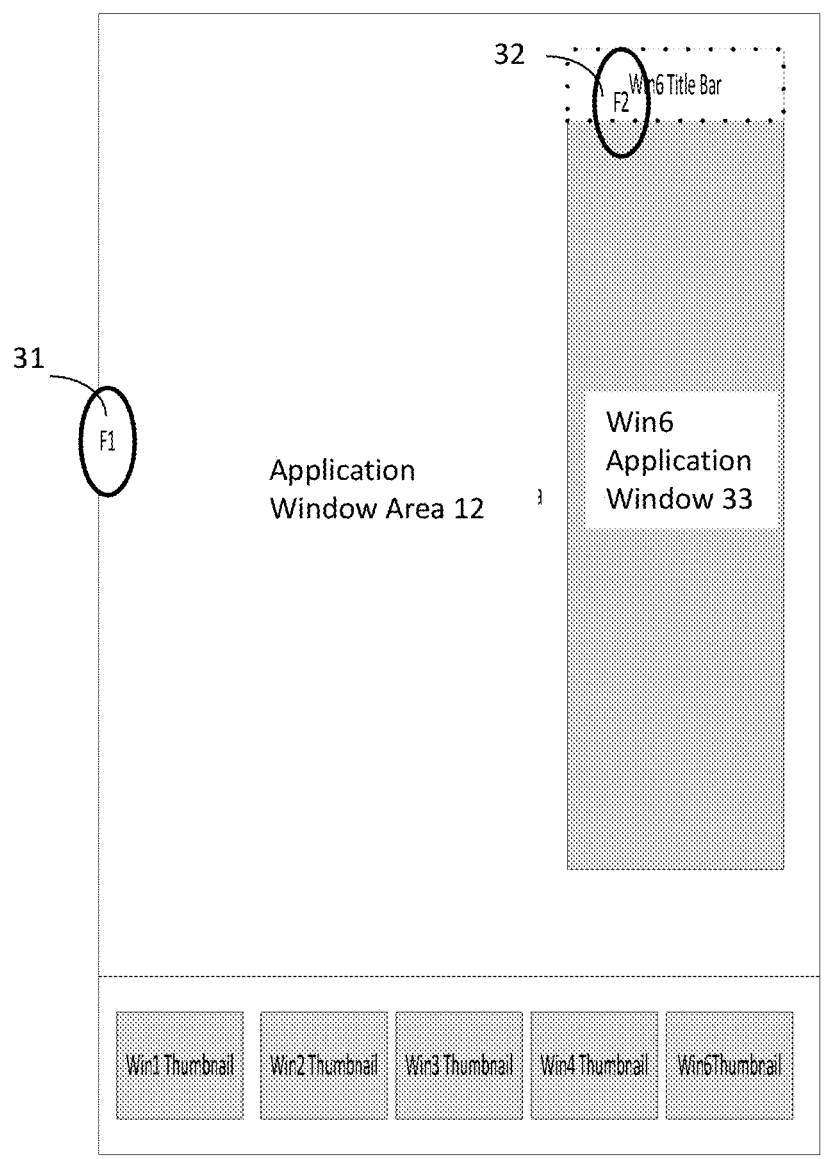
FIG. 3A depicts an exemplary edge identification and a selection of a displayed application window by a first and second finger in an embodiment of the present invention.
Figure 3B:
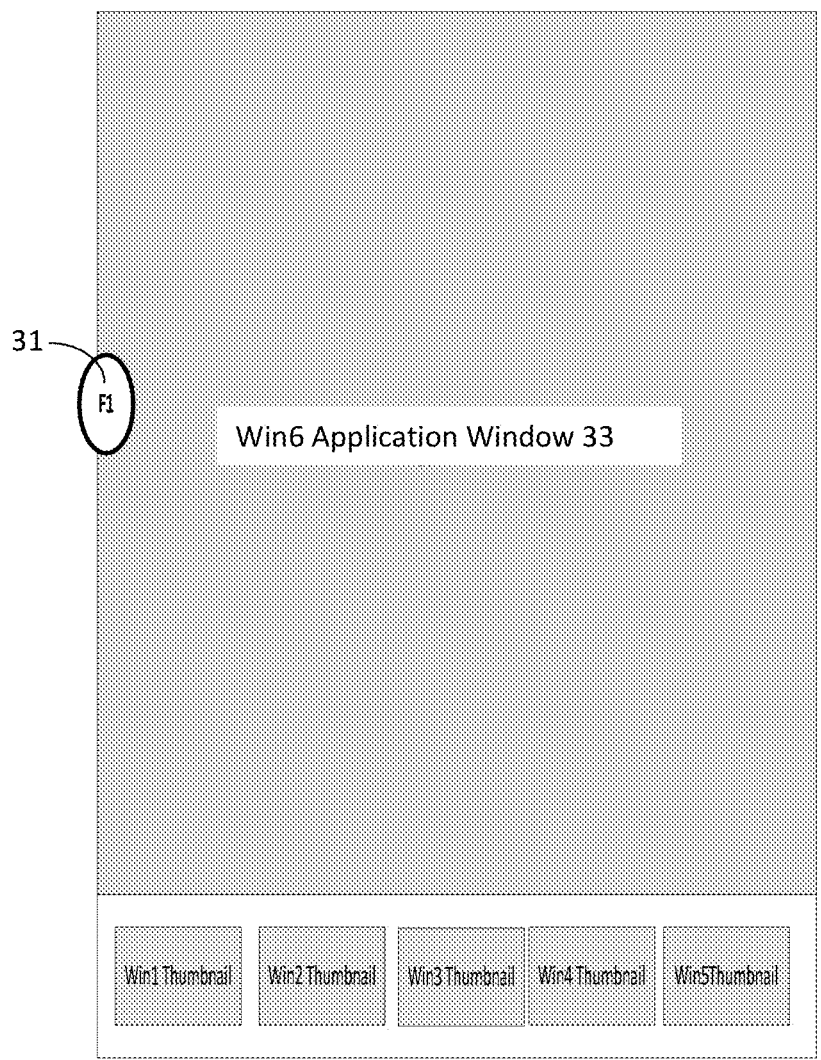
FIG. 3B depicts an automatic resizing of the selected application window of FIG. 3A upon the window being dragged to the identified edge and released in an embodiment of the present invention.

In another embodiment, an application window being displayed in the application window area 12 in a partially minimized state that occupies less than the entire application window area may be automatically re-positioned and re-sized. FIG. 3A depicts an exemplary edge identification and a selection of a displayed application window by a first and second finger in an embodiment of the present invention. A first finger 31 is used to identify one of the edges of the application display area. A second finger 32 may select, using the touch screen 2, a displayed application window, such as Win6 Application Window 33, that occupies less than the entire application window area 12. In one embodiment, the selection may be made by selecting the title bar of the application window. It will be appreciated that title bars are ordinarily, although not always, located at the top of an application window. By dragging the title bar (and the rest of the application window 33) with the second finger 32 to the edge identified by the first finger 31, the already opened application window can be relocated. In this example, since there is only the Win6 application window 33 currently being displayed in the application window area 12, the re-positioning and re-sizing of the application window 33 that occurs upon the release of the second finger at the identified edge causes the application window to expand to occupy the entire window display area as shown in FIG. 3B. It should be appreciated that in alternate embodiments, the application window may be finger selected without selecting the title bar.

In situations where there is already one or more application windows open in the application window area 12, embodiments of the present invention may re-size and re-position the existing application windows to accommodate the newly sized and positioned application window selected by the user, according to a pre-determined policy. For example, one exemplary policy is as follows: If an application window (or thumbnail) is dragged to the left or right edge, and there is a second application window in the application window area 12, then the application window area is divided into right and left halves. The dragged window (or window corresponding to the thumbnail icon) is re-sized to occupy the entire half of the application window area corresponding to the F1 indicated edge and the second application window is re-sized to occupy the other half. Dragging to the top or bottom screen edge is similar except that the screen is divided into top and bottom halves.

Figure 4A:
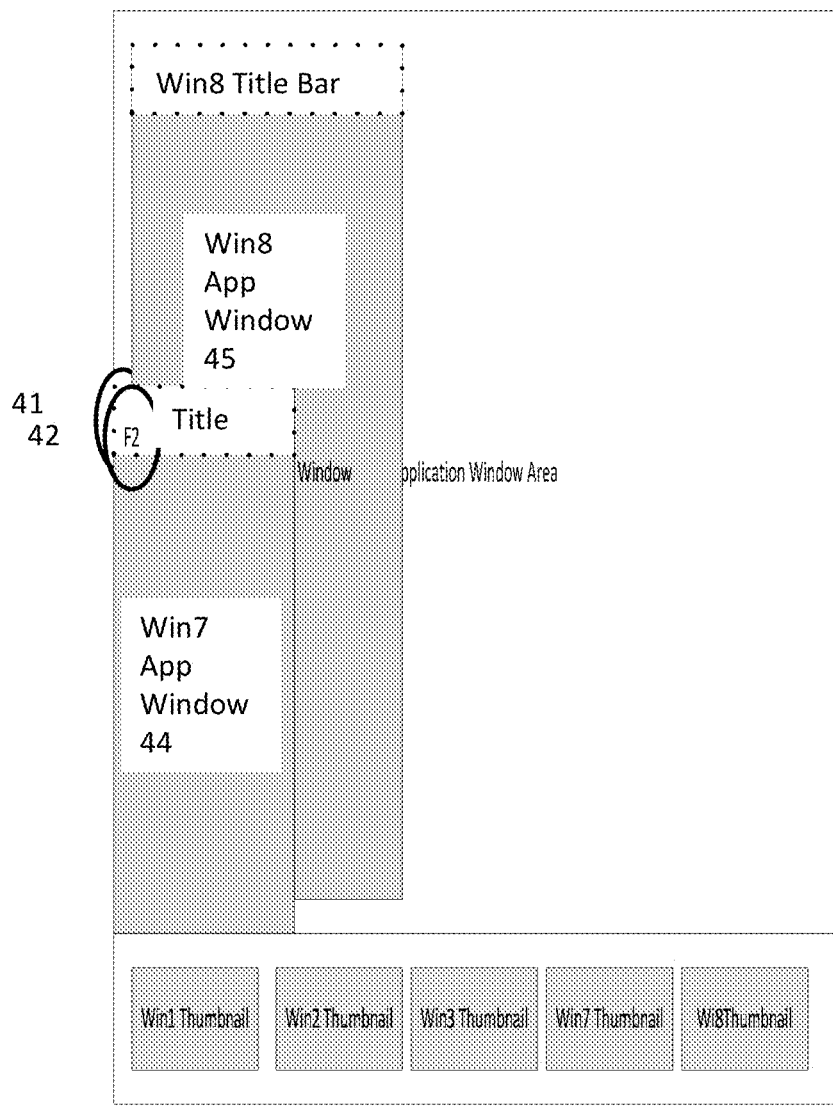
FIG. 4A depicts an exemplary side edge identification and a selection of one of two displayed application window by a first and second finger in an embodiment of the present invention.
Figure 4B:
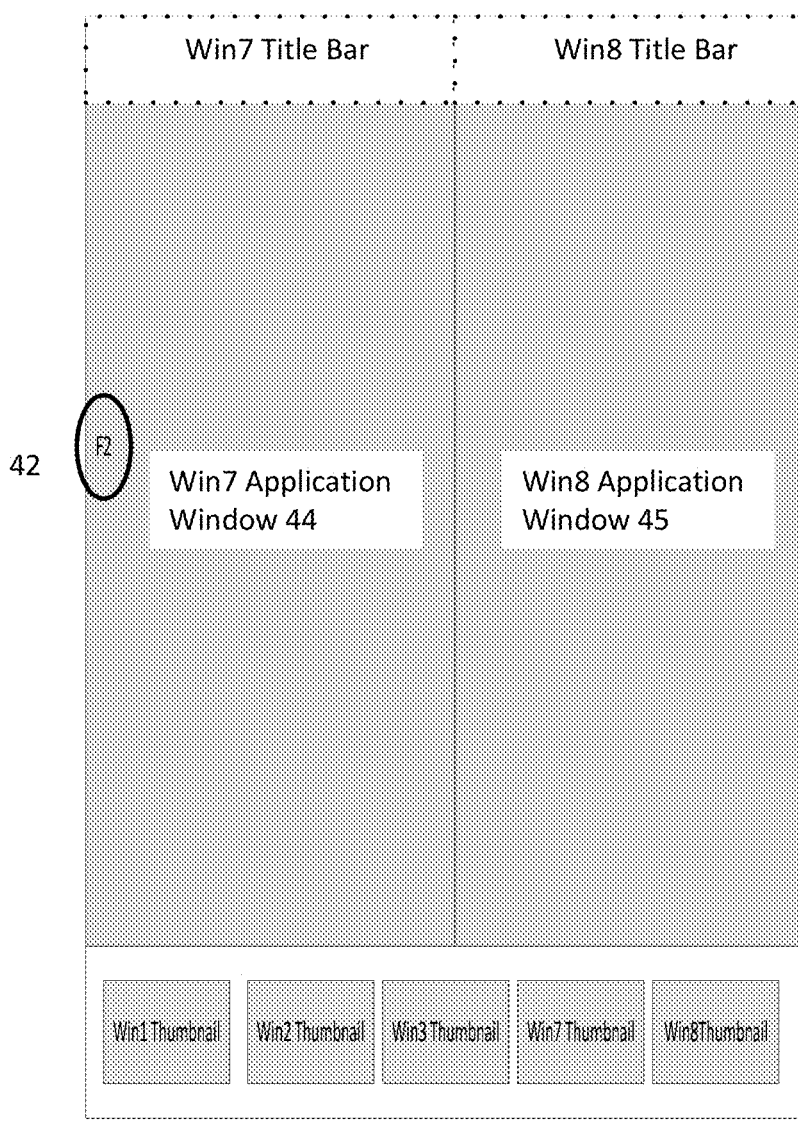
FIG. 4B depicts an automatic resizing and re-positioning of the selected application window and non-selected application window of FIG. 4A upon the window being dragged to the identified edge and released in an embodiment of the present invention.

For example, FIG. 4A depicts an exemplary side edge identification and a selection of one of two displayed application windows by a first and second finger in an embodiment of the present invention. In FIG. 4A, both Win7 Application Window 44 and Win8 Application Window 45 are being displayed in an overlapping fashion in the application window area 12. In one embodiment, a user may select the left edge of the application display area with a first finger 41 and the title bar of the Win7 Application Window 44 with a second finger 42. Dragging the title bar to the identified left edge and releasing the title bar causes the automatic re-sizing and re-positioning of both the selected Win7 Application Window 44 and the non-selected Win8 Application Window 45. As depicted in FIG. 4B both windows may be expanded to effectively utilize the ½ of the application window area 12 with the selected Win7 Application Window 44 being located on the identified edge.

Figure 4C:
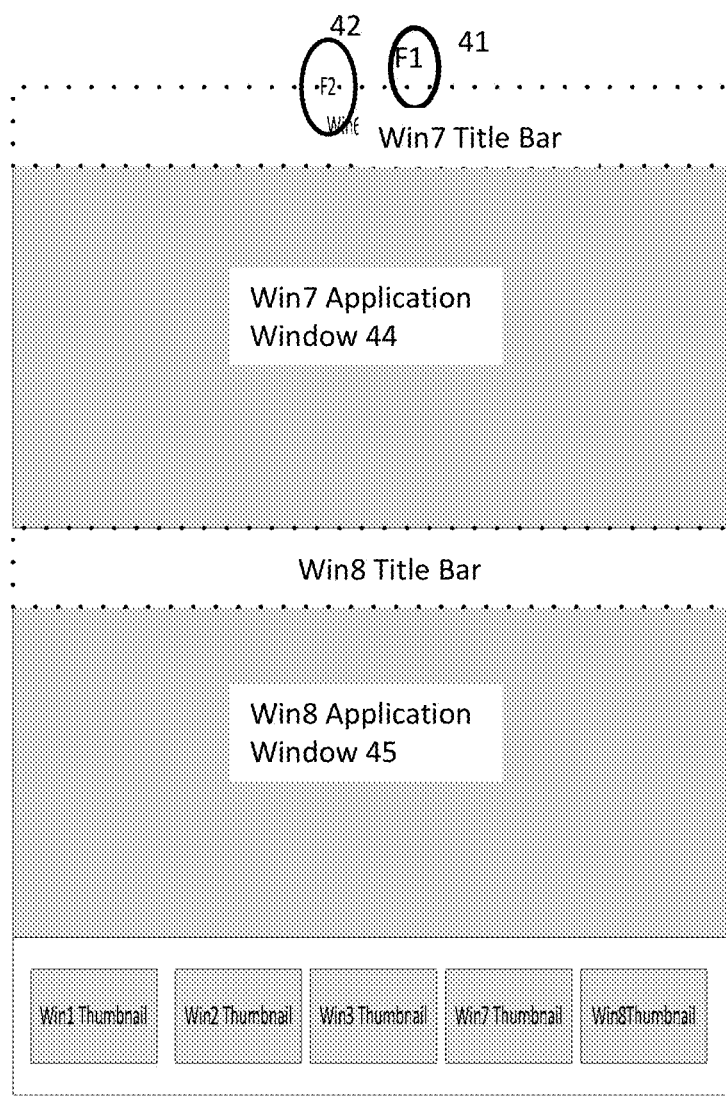
FIG. 4C depicts an alternate automatic resizing and re-positioning of a selected application window and non-selected application window upon the selected window being dragged to an identified top edge and released in an embodiment of the present invention.

FIG. 4C depicts an alternate automatic resizing and re-positioning of a selected application window and non-selected application window upon the selected window being dragged to an identified top edge and released in an embodiment of the present invention. In this example, the first finger 41 identifies the top edge of the application display area and the title bar of the Win7 Application Window 44 is dragged to that identified edge by the second finger 42 causing an automatic re-sizing and re-positioning of both the selected Win7 Application Window 44 and the non-selected Win8 Application Window 45 with respect to the top edge. In this case, the orientation of the Win7 Application Window 44 to the identified top edge causes the application window area to be split into a top half and bottom half with the non-selected Win8 Application Window 45 being displayed on the bottom half.

Figure 5A:
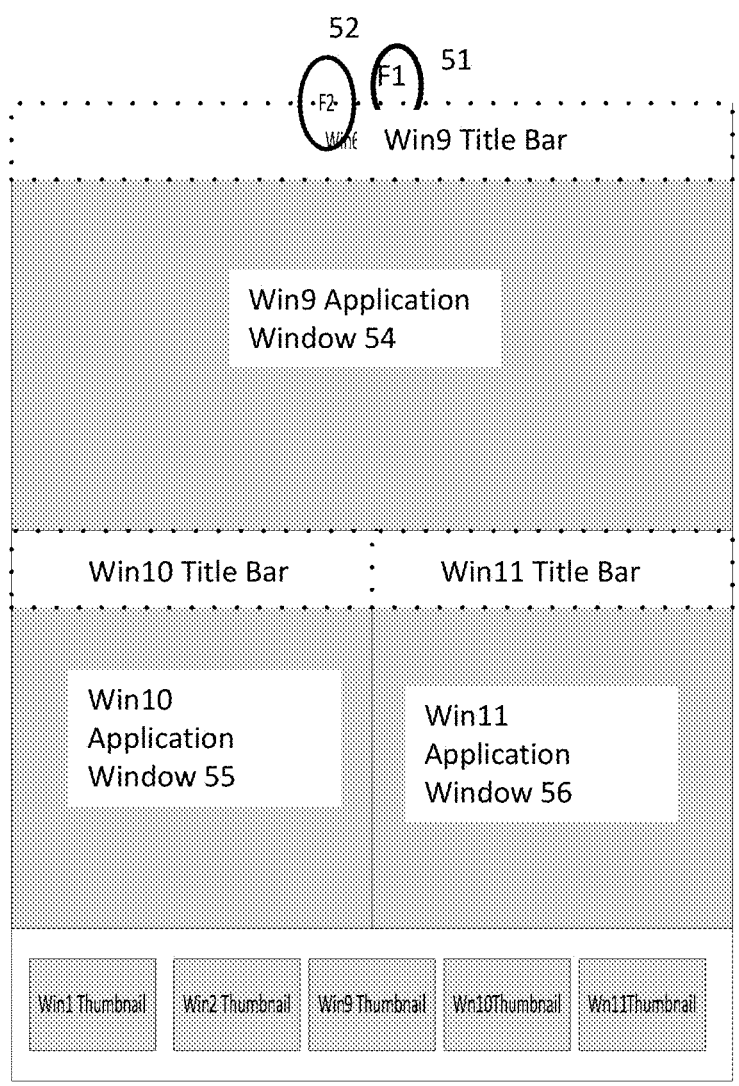
FIG. 5A depicts an automatic resizing and re-positioning of a selected application window and two non-selected application windows upon the selected application window being dragged to an identified top edge and released in an embodiment of the present invention.

Embodiments of the present invention may also re-size and re-position more than two application windows. With more than two application windows, the potential window management policies are more varied. For example, one policy is that for three or more windows the selected application window is given half the screen and the other application windows that were already open divide the other half of the application window area. FIG. 5A depicts an automatic re-sizing and re-positioning of a selected application window and two non-selected application windows that follows a selected application window being dragged to an identified top edge and released in an embodiment of the present invention. In FIG. 5A, a first finger 51 identifies a top edge and a second finger 52 drags a title bar of one of three displayed application windows, Win9 Application Window 54, to the top edge. Upon the release of the second finger, the three application windows are automatically re-positioned and re-sized as shown with Win9 Application Window 54 occupying the top ½ of the application window area 12 next to the identified edge and Win10 Application Window 55 and Win11 Application Window 56 dividing the bottom ½ of the application window area.

Figure 5B:
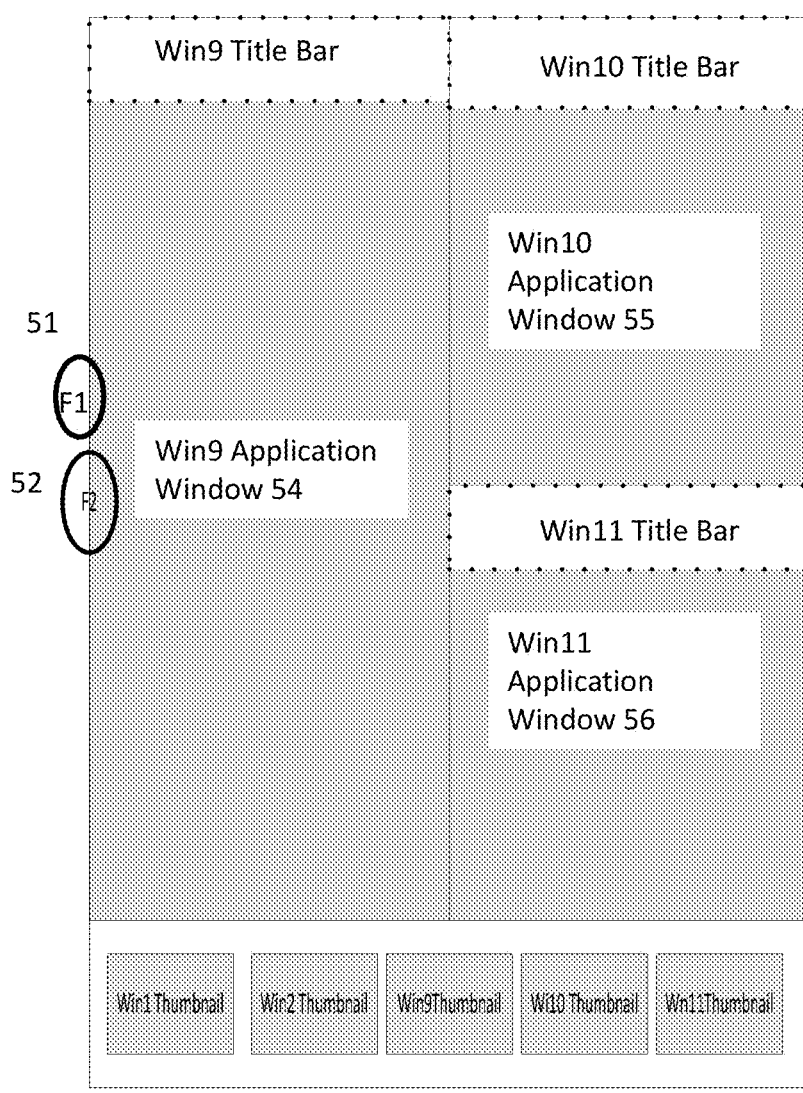
FIG. 5B depicts an automatic resizing and re-positioning of a selected application window and two non-selected application windows upon the selected application window being dragged to an identified side edge and released in an embodiment of the present invention.

Similarly, FIG. 5B depicts an automatic resizing and re-positioning of a selected application window and two non-selected application windows upon the selected application window being dragged to an identified side edge and released in an embodiment of the present invention. In FIG. 5B, a first finger 51 identifies a left edge and a second finger 52 drags a title bar of one of three displayed application windows, Win9 Application Window 54, to the left edge. Upon the release of the second finger, the three application windows are automatically re-positioned and re-sized as shown with Win9 Application Window 54 occupying the left ½ of the application window area 12 next to the identified edge and Win10 Application Window 55 and Win11 Application Window 56 dividing the right ½ of the application window area.

Figure 5C:
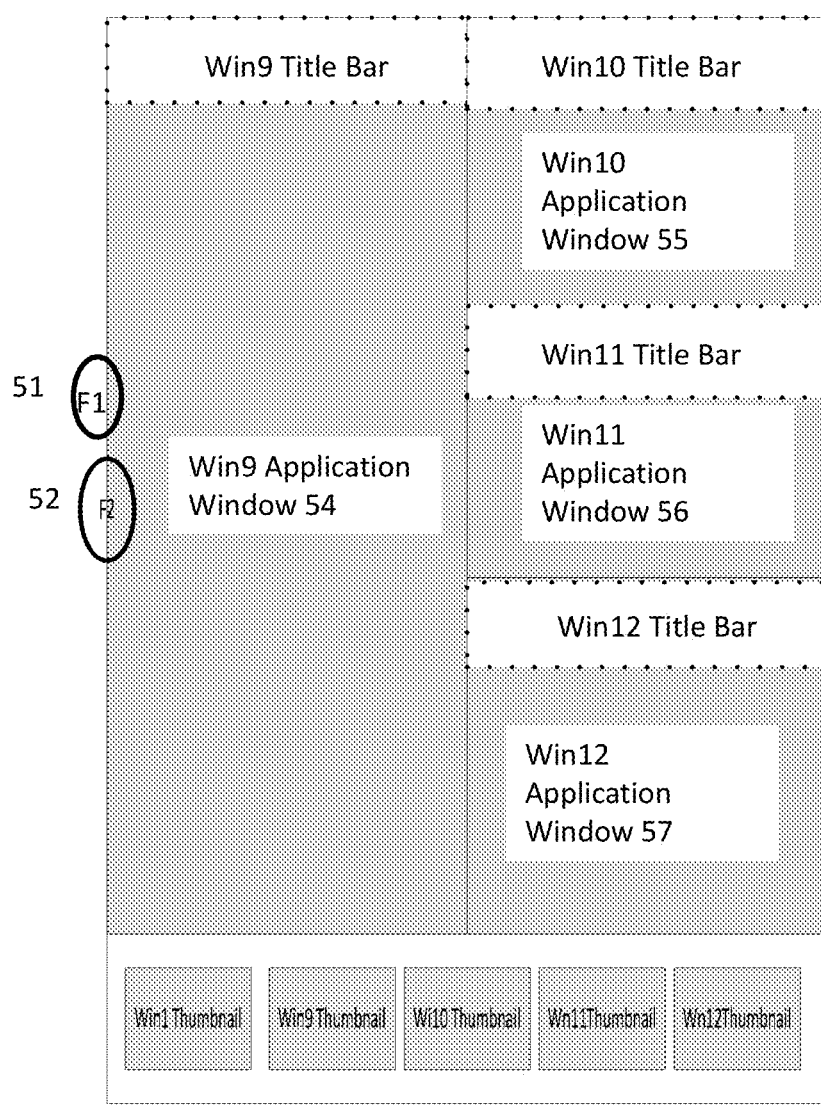
FIG. 5C depicts an automatic resizing and re-positioning of a selected application window and three non-selected application windows upon the selected application window being dragged to an identified side edge and released in an embodiment of the present invention.

FIG. 5C depicts an automatic resizing and re-positioning of a selected application window and three non-selected application windows upon the selected application window being dragged to an identified side edge and released in an embodiment of the present invention. In FIG. 5C, a first finger 51 identifies a left edge and a second finger 52 drags a title bar of one of four displayed application windows, Win9 Application Window 54, to the left edge. Upon the release of the second finger, all four application windows are automatically re-positioned and re-sized as shown with Win9 Application Window 54 occupying the left ½ of the application window area 12 next to the identified edge and Win10 Application Window 55, Win11 Application Window 56 and Win12 Application Window 57 dividing the right ½ of the application window area 12 into thirds.

It should be appreciated that the embodiments of the present invention are not limited to the allocations of application windows within the application window area that are specifically discussed above and other implementations are possible within the scope of the present invention. Although not specifically illustrated herein, the bottom edge of the application display area may also be selected. In such a case, the alignment of the selected application window will be offset from the bottom touch screen edge so as to accommodate the presence of the application selection area 13 within the application display area . This offset concept also applies in the event the application selection area 13 is located on a different edge (i.e. is located on a side or top edge) of the application display area than discussed herein.

As discussed above, in embodiments of the present invention, one or more fingers indicate an edge of the application display area. This indication may be detected in one of several ways. For example, the touch screen may correctly detect that the finger touch includes the area directly adjacent to the screen edge. This detection process can be further refined by applying a size profile to a finger touch adjacent to the screen edge to determine if the finger touch is largest near the screen edge and gets smaller away from the screen edge. This characteristic is due to the fact that a finger touch covers a large area in a roughly circular area from the center of finger contact. For example, if the detected finger touch is e half off that screen and half on the screen, then the contact area is roughly a semicircle with the largest area of contact near the edge and the controller 6 may respond to such identified contacts. Alternatively, as noted above, the bezel surrounding the touch screen and display panel may act as a simple contact switch and/or include a pressure sensor so that when a finger touch registers near the edge of the screen, the bezel switch or sensor indicates the desired edge. With four such bezel switches or sensors, the four edges of the touch screen and display area can be indicated. In another embodiment, the rear of the screen (or case) may have similar switch or sensor. The switches or sensors may or may not be marked with a visible button. This configuration may be used in the case where the form factor of the device is such that it is gripped in the hand and the thumb used as the dragging finger. In this case, windows may be dragged toward the edge with the gripping hand (either left or right).

Figure 6:
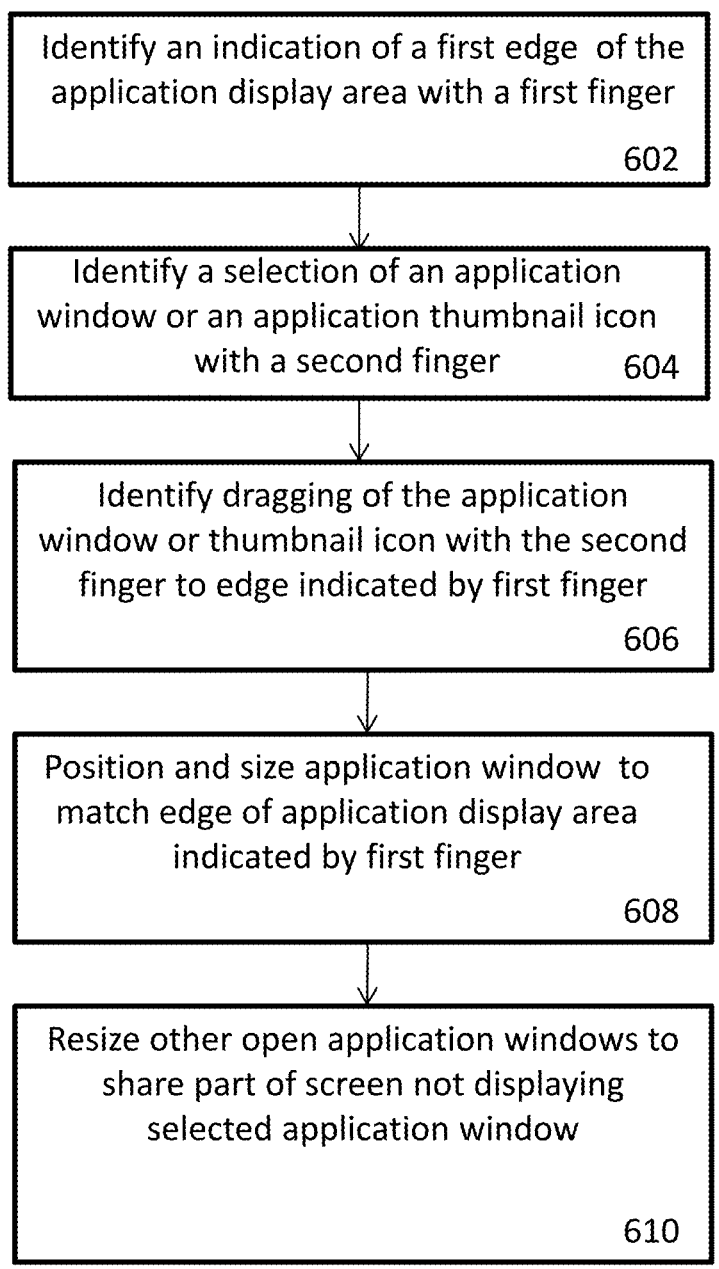
FIG. 6 depicts an exemplary sequence of steps performed by an embodiment of the present invention to re-position and re-size application windows.
Figure 7:
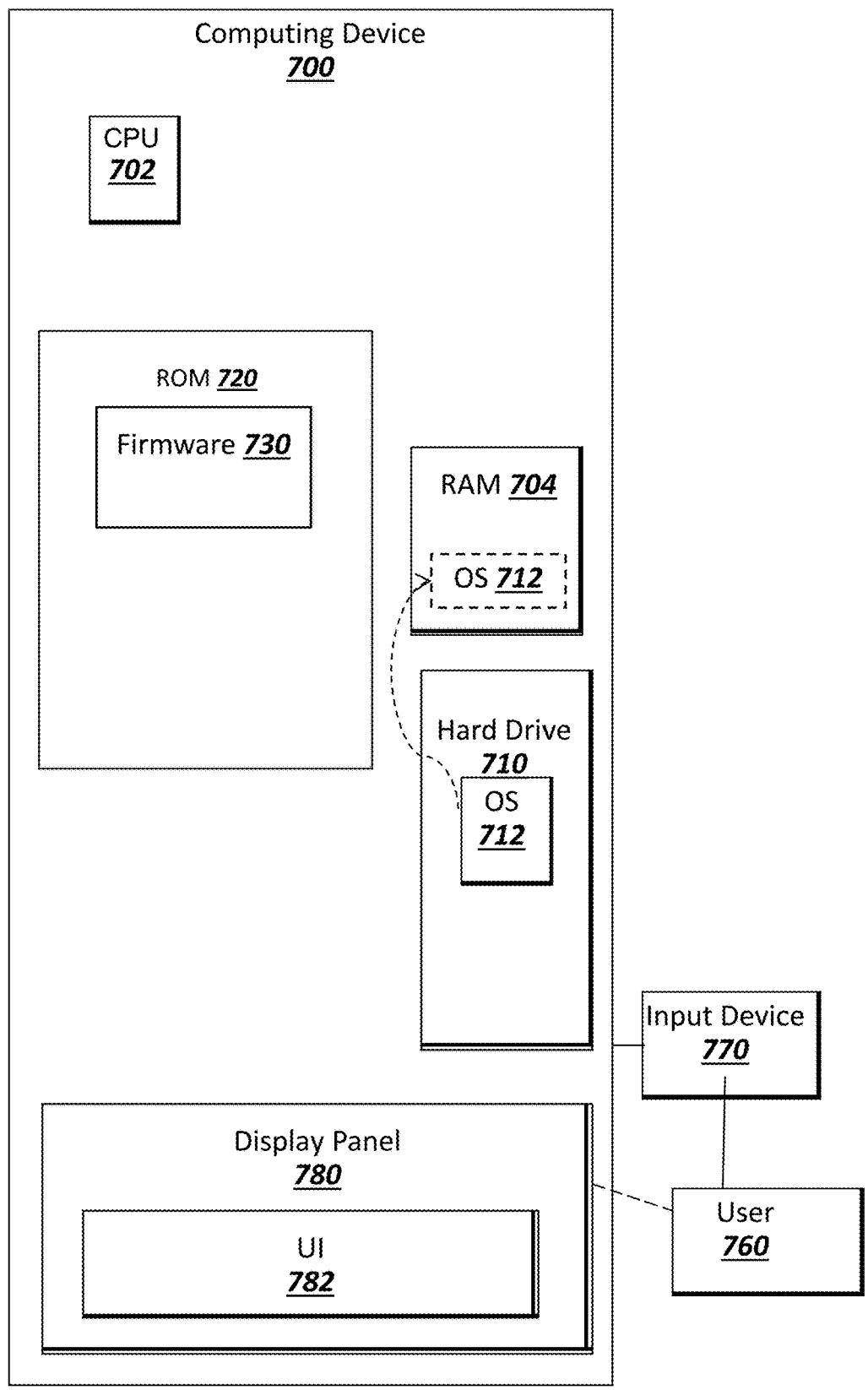
FIG. 7 depicts an exemplary environment suitable for practicing an embodiment of the present invention.

FIG. 6 depicts an exemplary sequence of steps performed by an embodiment of the present invention to re-size and re-position application windows. The sequence begins with the identification of an indication of an edge of an application display area made with a user's first finger (step 1202) and identifying a selection of an application window or an application thumbnail icon on the touch screen made by the user with a second finger (step 1204). It will be appreciated that the order of the user selecting the application window or thumbnail icon and identifying the edge may be reversed. The edge of the application display area may be indicated using a number of different techniques including touching a screen edge directly or identifying finger contact with the bezel surrounding the touch screen. Following an identification of a user dragging the selected application window or thumbnail icon to the indicated edge (step 1206), the application window (or application window corresponding to the thumbnail) will be automatically sized and positioned with respect to the selected edge (step 1208). Further, in the event other application windows are already open, the other application windows may be automatically re-positioned to equally share one half/third/fourth/etc. of the display area of the screen while the selected application window is displayed on the other half (step 1210). It will be appreciated that the exact allocation of the application window area may also include other dimensions and the embodiments of the present invention are not limited to the examples specifically described herein.

In another embodiment , other portions of the application window than those discussed above may be used for the dragging operation, for example, when the application window contains only "read-only" contents. That is, instead of selecting and dragging the application window using the title bar at the top of the window, the window might also be dragged by touching some location in the middle (or other part) of the application window. This works for read-only content since the touch would not be misinterpreted as selection of content in that application window.

In another embodiment, the bottom or right edges of a window, or window corners may be dragged to a screen edge and that edge may be re-sized to match that edge. In this case, the application window is not re-positioned, but only re-sized. Also, in this case, other windows may not be re-positioned and re-sized, but instead may remain unchanged.

FIG. 13 depicts an exemplary environment suitable for practicing an embodiment of the present invention. A computing device 700 includes a CPU 702. The computing device 700 may be a tablet computing device, smartphone, laptop computer, or some other type of computing device equipped with a processor and touch screen. The computing device 700 may include a memory 704 such as Random Access Memory (RAM). An operating system 705 may be stored on a hard drive 710 in, or in communication with, computing device 700 and may be loaded into memory 704 as part of a boot process performed by the computing device.

The computing device 700 may also include ROM 720. In some cases the system design may incorporate multiple ROM devices. The ROM 720 may include firmware 730 for performing the boot process and other services. An optional input device 770 (in addition to the touch screen) such as a keyboard that is accessible to a user 760 may be in communication with, or integrated with, the computing device 700.

The computing device 700 includes a display 780 which includes a touch screen user interface 782. Although the display 780 is shown as integrated with the computing device 700 in FIG. 13, it will be appreciated that the display may also be a separate display communicating with the computing device in a wireless or wired fashion.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for re-positioning and re-sizing application windows in a computing device equipped with a touch screen and display panel, comprising:

identifying an indication of a first edge of an application display area on the display panel, the identifying by the computing device using a size profile of a finger to detect a partial contact of a first finger with both the first edge and the touch screen immediately adjacent to the first edge, the size profile identifying an area of finger contact with the touch screen, the area of finger contact with the touch screen bounded by an arc intersecting the first edge at a first and second point, wherein, within the area of finger contact, a straight line distance between the first and second points is larger than a straight line distance between any two other points on the arc respectively offset an equal distance from the first and second points;

identifying a selection of an application window or an application thumbnail icon displayed on the display panel, the application window or application thumbnail icon selected with a second finger using the touch screen;

identifying through the touch screen an indication of a dragging of the selected application window or thumbnail icon by the second finger to the first edge that the first finger partially contacted;

re-positioning and re-sizing, in response to a detected release by the second finger of the selected application window or thumbnail icon at the indicated first edge, the selected application window or an application window corresponding to the selected thumbnail icon; and re-positioning and re-sizing automatically, in response to the release, two or more open application windows to share the application display area with the selected application window or the application window corresponding to the selected thumbnail icon, the selected application window or the application window corresponding to the selected thumbnail icon displayed in a first portion of the application display area, the two or more open application windows being repositioned and resized to occupy all of a remaining second portion of the application display area.

2. The method of claim 1 wherein the two or more application windows are equally sized in the remaining second portion of the application display area.

3. The method of claim 2 wherein the first portion of the application display area is ½ of the application display area and the two or more application windows are displayed in the other ½ of the application display area.

4. A non-transitory medium storing computer-executable instructions for re-positioning and resizing application windows in a computing device equipped with a touch screen and display panel, the instructions when executed causing the computing device to:

identify an indication of a first edge of an application display area on the display panel, the identifying by the computing device using a size profile of a finger to detect a partial contact of a first finger with both the first edge and the touch screen immediately adjacent to the first edge, the size profile identifying an area of finger contact with the touch screen, the area of finger contact with the touch screen bounded by an arc intersecting the first edge at a first and second point, wherein, within the area of finger contact, a straight line distance between the first and second points is larger than a straight line distance between any two other points on the arc respectively offset an equal distance from the first and second points;

identify a selection of an application window or an application thumbnail icon displayed on the display panel, the application window or application thumbnail icon selected with a second finger using the touch screen;

identify through the touch screen an indication of a dragging of the selected application window or thumbnail icon by the second finger to the first edge that the first finger partially contacted;

re-position and re-size, in response to a detected release by the second finger of the selected application window or thumbnail icon at the indicated first edge, the selected application window or an application window corresponding to the selected thumbnail icon; and re-position and re-size automatically, in response to the release, two or more open application windows to share the application display area with the selected application window or the application window corresponding to the selected thumbnail icon, the selected application window or the application window corresponding to the selected thumbnail icon displayed in a first portion of the application display area, the two or more open application windows being repositioned and resized to occupy all of a remaining second portion of the application display area.

5. The medium of claim 4 wherein the two or more application windows are equally sized in the remaining second portion of the application display area.

6. The medium of claim 5 wherein the first portion of the application display area is ½ of the application display area and the two or more application windows are displayed in the other ½ of the application display area.

7. A computing device configured to re-size application windows in response to touch indicators, the computing device comprising:

a touch screen;

a display panel; and a processor configured to execute instructions that cause the computing device to:

identify an indication of a first edge of an application display area on the display panel, the identifying by the computing device using a size profile of a finger to detect a partial contact of a first finger with both the first edge and the touch screen immediately adjacent to the first edge, the size profile identifying an area of finger contact with the touch screen, the area of finger contact with the touch screen bounded by an arc intersecting the first edge at a first and second point, wherein, within the area of finger contact, a straight line distance between the first and second points is larger than a straight line distance between any two other points on the arc respectively offset an equal distance from the first and second points;

identify a selection of an application window or an application thumbnail icon displayed on the display panel, the application window or application thumbnail icon selected with a second finger using the touch screen;

identify through the touch screen an indication of a dragging of the selected application window or thumbnail icon by the second finger to the first edge that the first finger partially contacted;

re-position and re-size, in response to a detected release by the second finger of the selected application window or thumbnail icon at the indicated first edge, the selected application window or an application window corresponding to the selected thumbnail icon; and re-position and re-size automatically, in response to the release, two or more open application windows to share the application display area with the selected application window or the application window corresponding to the selected thumbnail icon, the selected application window or the application window corresponding to the selected thumbnail icon displayed in a first portion of the application display area, the two or more open application windows being repositioned and resized to occupy all of a remaining second portion of the application display area.

8. The computing device of claim 7, further comprising: a memory holding a size profile of a finger.

* * * * *